No. 747,190. PATENTED DEC. 15, 1903.
W. KRAUSS & A. BERRENBERG.
MOTOR WHEEL FOR BICYCLES OR OTHER VEHICLES.
APPLICATION FILED AUG. 1, 1895.
NO MODEL. 2 SHEETS—SHEET 1.
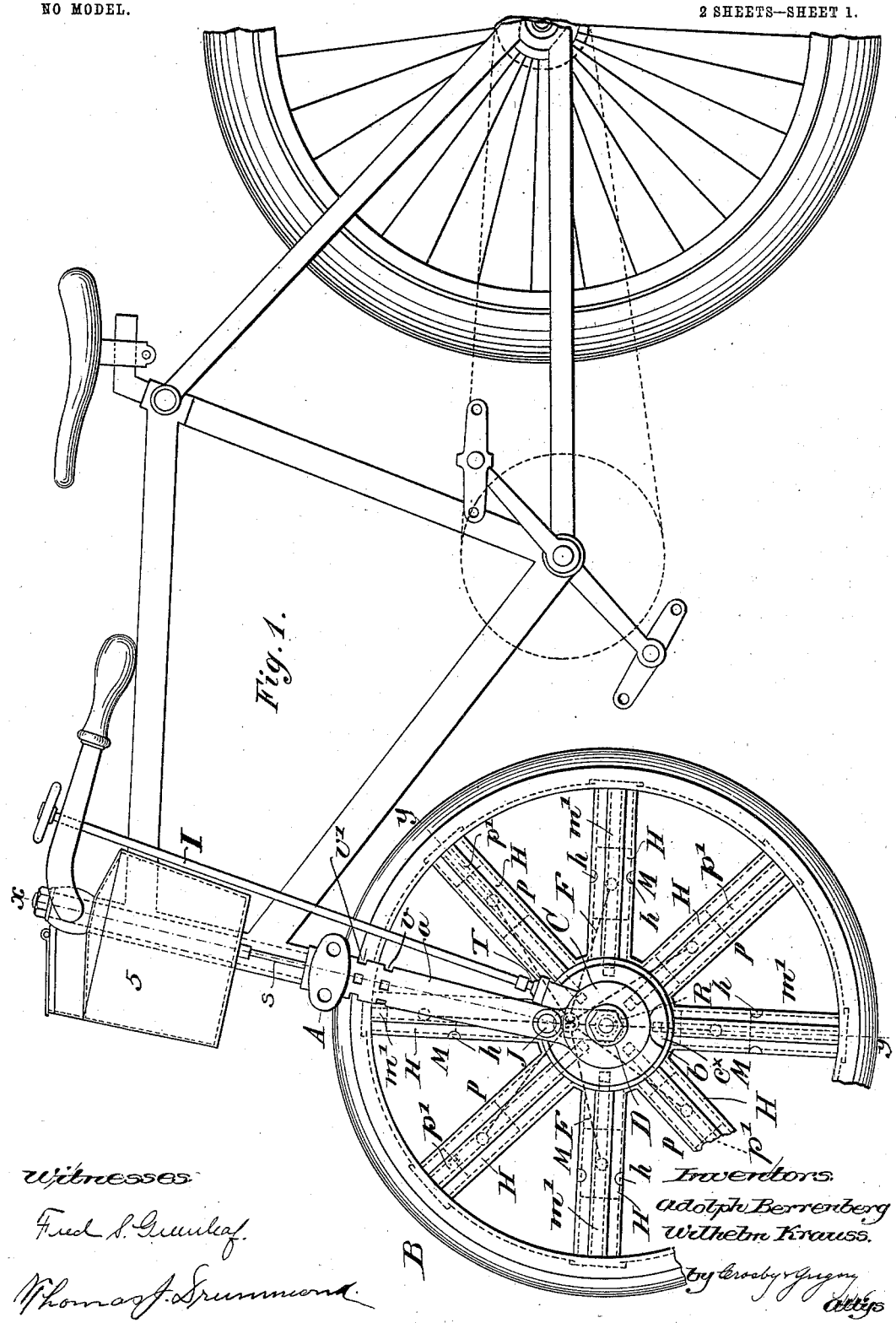

No. 747,190. PATENTED DEC. 15, 1903.
W. KRAUSS & A. BERRENBERG.
MOTOR WHEEL FOR BICYCLES OR OTHER VEHICLES.
APPLICATION FILED AUG. 1, 1895.
NO MODEL. 2 SHEETS—SHEET 2.
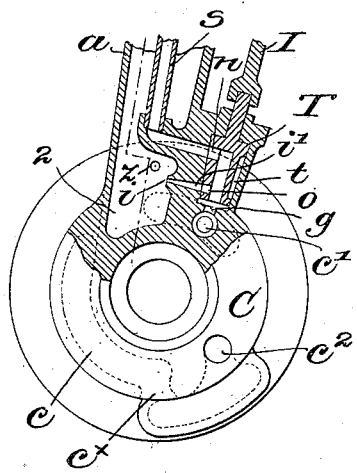
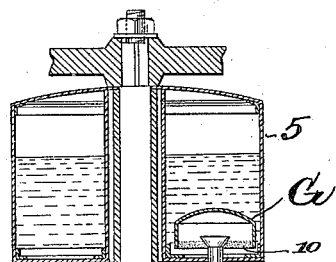
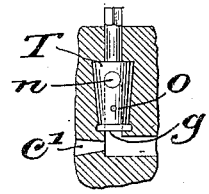
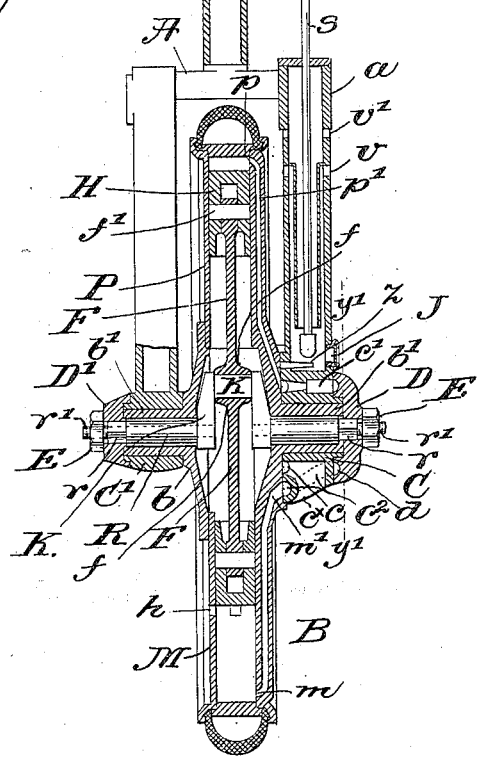
Witnesses
Inventors
Adolph Berrenberg
Wilhelm Krauss
by Crosby Gregory attys No. 747,190. Patented December 15, 1903.

UNITED STATES PATENT OFFICE.

WILHELM KRAUSS, OF BERLIN, GERMANY, AND ADOLPH BERRENBERG, OF BOSTON, MASSACHUSETTS.

MOTOR-WHEEL FOR BICYCLES OR OTHER VEHICLES.

SPECIFICATION forming part of Letters Patent No. 747,190, dated December 15, 1903.

Application filed August 1, 1895. Serial No. 557,801. (No model.)

*To all whom it may concern:*

Be it known that we, WILHELM KRAUSS, a subject of the German Emperor, residing in Berlin, Germany, and ADOLPH BERRENBERG, a citizen of the United States, residing at Boston, Massachusetts, have invented certain new and useful Improvements in Motor-Wheels for Bicycles or other Vehicles, of which the following is a specification, and for which Letters Patent have been granted in Great Britain, No. 9,922, dated May 20, 1895; in France, No. 247,249, dated May 8, 1895; in Belgium, No. 115,727, dated May 22, 1895, and in Switzerland, No. 10,305, dated May 9, 1895.

Our invention relates to driving-motors for bicycles and other vehicles, and has for its object the production of a motor-wheel light in weight, of simple inexpensive construction, and adapted to be fitted to existing vehicles with but little alteration of the latter.

The use of sensitive valves, springs, and all complicated mechanism of a similar character has been avoided in designing the machine, together with "dead-points," thus rendering it possible to dispense with heavy balance-weights and secure a perfect and uniform motion with a minimum vibration.

The various features of our invention will be hereinafter described, and particularly pointed out in the claims.

Figure 1 shows in side elevation portions of a bicycle embodying our invention. Fig. 2 is a sectional view, partly along the line $x\ x$ and partly on the broken line $y\ y$, Fig. 1. Fig. 3 is a sectional view on the line $y'\ y'$, Fig. 2, looking toward the left, showing the disk C partly broken away. Fig. 4 is a detail of construction to be hereinafter referred to.

In the drawings our invention is shown as embodied in a gas-motor applied to the front wheel B of a bicycle, the frame of which may be of usual shape and construction, save the front fork A, to be described later, when it is desired to apply our improved motor to the front wheel, it being understood that the following description refers only to one embodiment of our invention selected as convenient to enable our invention to be understood. The hub $b$ of the wheel B is provided with hollow journals $b'$, adapted to revolve in and be supported by bearings C C' in the arms of the fork A. Through these journals extend a fixed shaft R, having near its ends squared portions $r\ r$, adapted to fit snugly in square openings in the washers D D', the shaft also having threaded portions $r'\ r'$ to receive nuts E E, its fixed position relative to the wheel being maintained by splines or other suitable means (not shown) on the washers D D' and bearings C C', which prevent the said washers, and therefore the shaft, from rotating about the bearings. At its middle and within the hub the shaft R is offset to form a yoke K, the connecting portion $k$ of which is parallel to the axis of the wheel and serves as a common fulcrum or crank-shaft for the inner ends $f$ of a series of radial connecting-rods F, to whose outer ends are pivotally affixed, as at $f'$, the pistons H, adapted to reciprocate in cylinders P M, mounted on the wheel and in this instance radially in the plane of the rim. One half of said cylinders (designated M) serve as driving-cylinders, while the other half, P, serve as air-cylinders, a distribution of functions the means to accomplish which we believe to be novel with us, the cylinders being arranged in pairs consisting each of a driving and an air cylinder, between which periodical communication upon rotation of the wheel is effected through ports $p\ m$, canals $p'\ m'$, with which the cylinders are respectively provided, and in coöperation therewith a valve, shown as a disk, constituting the bearing C and having body passages or canals $c\ c'\ c^2$, whose openings are adapted to register at times with the openings of the cylinder-canals. Upon rotation of the wheel B and the cylinders mounted thereon the pistons in the cylinders are also carried around, but as they are connected by the rods F to the fixed crank-shaft $k$ the difference between the respective centers of rotation of pistons and cylinders results in a regular reciprocating movement of one with relation to the other.

Through the canal $c$, which communicates with the atmosphere by an opening $c^x$, the air-cylinder P, whose canal $p'$ during the last half of the downward turn of the wheel passes underneath the said canal, sucks in air in order to compress the same during the upward turn and just before the highest position to force the same into the canal $c'$ of the bearing. By means of the annular canal $d$ of the cap or washer D the air then passes into the canal $c^2$ of the disk, into the canal $m'$ of the driving-cylinder, and thence through the port $m$ into the cylinder itself. Petroleum or other suitable liquid is mixed with the air while the same is passing through the canal $c'$ on its passage from $g$. As the wheel turns further the combustible mixture now in the driving-cylinder is compressed. At the upper dead-point of the driving-cylinders the canal $m'$ comes into communication with the igniting-tube $z$, whereupon the mixture is exploded and causes the wheel to continue to turn. Just before the driving-cylinder reaches its lower vertical position the piston frees the openings $h$, arranged all round the cylinder, in order that the products of combustion may freely escape in consequence of the excess of pressure still existing in the cylinder and by the pressure exerted by the incoming air from the air-cylinder (as the latter approaches its upper vertical position) by way of $p'$ $c'$ $d$ $c^2$ $m'$, so that when the piston once more closes the openings $h$ the cylinder is again filled with a combustible mixture. This operation is repeated continuously by each pair of cylinders corresponding to each turn of the wheel.

The supply of petroleum or other liquid is effected from the cistern or holder 5 through the tube S, lying in the arm $a$ of the fork, and flows in the first place to the regulating-cock T, Figs. 3 and 4, whence it flows into the canal $c'$ through the opening $g$ or is carried there by the air-current and by means of the burner $i$ and the small opening $o$ feeds the flame of the igniting-tube $z$.

The necessary air for the igniting-flame enters the fork-arm $a$ through the openings $v$, and the spent air passes out round the tube S and through the openings $v'$. By this means the liquid flowing toward the regulating-cock is preheated and partially gasified, while the air-supply is also preheated, any overheating of the arm of the fork being prevented thereby.

In order that the vapors which form and rise in the tube S may not escape direct into the full cistern 5, in which is contained petroleum, bezolin, alcohol, or other easily-combustible liquid, a bell G is arranged over the mouth of the tube in the cistern, and as the edge of said bell is deeper than the mouth of the tube the outlet is thus sealed hydraulically. Underneath the bell and round the tube S is a filter 10, which prevents the entry of impurities in the tube.

The regulating-cock T is turned by means of a key I, which is so arranged as to be within easy reach. The plug of the cock has a longitudinal canal $t$, the function of which is to allow the burner alone to be fed in the first place, so that when easily-combustible or quick-burning liquids, such as alcohol or benzolin, are used a supply of fuel for heating the igniting-tube can be had direct from the cistern before the moter is set in motion. When the cock is so turned that the opening $n$ in the plug is directly opposite or full before the mouth of the tube S, the liquid can flow direct to the mixing-canal $c'$ and the passage is free to the igniting-tube. If now the cock is turned a little more toward the right, the access to the igniting-flame remains free in consequence of the broader opening $i'$, while the supply of oil is lessened by the narrowing of the opening $n$. It is necessary to regulate the supply in this way when traveling slowly or when using mixtures which contain little gas and are difficult of ignition, such as petroleum. In turning the cock to the left the supply to the igniting-flame is closed and the quantity of liquid passing to the mixing-canal $c'$ is lessened. This way of regulating is adopted in the case of easily-combustible or quick-burning liquids, such as alcohol or benzolin, and which as soon as the motor has got properly started render the continuation of the igniting-flame unnecessary or necessitate the extinguishing of the same in order to prevent premature explosions.

In using a slow-burning liquid, such as petroleum, it is necessary for the purpose of heating the motor to pour a little methylated spirit in the cavity 2 in the inside of the arm of the fork and to ignite the same by means of the window J. Immediately the igniting-tube is red-hot, which can be ascertained by means of the window J above mentioned, the wheel is turned and the regulating-cock T opened and the motor is started.

If it is preferred to retain the pedals, this can be done, and when the motor forms the front wheel of the machine the pedals can be used for starting the same after the ignition of the methylated spirit in the cavity 2 previously, the cock having meanwhile been correspondingly regulated. After a few minutes the cock can be reversed, and the motor will thenceforward do the work itself.

If the motor forms the hind wheel of the machine, the pedals can likewise be retained, when the cover of the motor-wheel is converted into a chain-pulley.

Having thus fully described our invention, it is to be understood that we do not limit ourselves to the exact details of construction shown and described, nor in general otherwise than as set forth in the claims taken in connection with this specification.

We claim—

1. In a motor-wheel, the following instrumentalities, viz: a source of fluid-power, a plurality of radially-mounted fluid-pressure cylinders, provided with suitable ports and conducting-channels, their reciprocating pistons, a common fixed fulcrum, a connecting-rod for and intermediate each of said pistons and said fulcrum, and a fixed disk valve provided with channels arranged to receive a supply of fuel from said source, said cylinder-channels being brought into communication with said disk channels, which upon rotation of the wheel connect certain of the cylinders directly with each other and with a suitable source of fluid-power periodically, substantially as described.

2. The combination with a vehicle-wheel, and a support; of a fulcrum connected to said support and about which said wheel may rotate; a fuel-supply; a cylinder for compression and explosion only mounted on said wheel and provided with suitable ports; a cylinder for pumping only also on said wheel and provided with suitable ports; pistons and piston-rods intermediate said cylinders and fulcrum respectively; connections between said cylinder-ports and fuel-supply; and a controlling-valve for said connections, substantially as described.

3. A wheel; a gas-motor therefor comprising a plurality of cylinders mounted radially upon said wheel; a common fulcrum about which said cylinders may revolve; pistons and connecting-rods intermediate said cylinders and fulcrum; a fuel-receptacle; an igniting device; and connections whereby rotation of said wheel causes a certain series of said cylinders to draw in fuel and air for admixture, to which function said series is devoted exclusively, and thereafter deliver said mixture for compression in certain other of said cylinders in which it is exploded by said igniting device, substantially as described.

4. A motor-wheel, having a peripheral tread; and a series of fluid-pressure cylinders, mounted on, and to rotate with said wheel, certain cylinders in said series being arranged for the exclusive functions of compression and explosion, and certain other cylinders for pumping exclusively, said cylinders coöperating in couples respectively consisting of one explosion and one pumping cylinder, each couple to impart a rotative impulse to said wheel at each revolution.

In witness whereof we have hereunto signed our names in the presence of two subscribing witnesses.

WILHELM KRAUSS.
ADOLPH BERRENBERG.

Witnesses:
CHAS. H. DAY,
CHAS. KRUGER.